US010411799B1

(12) United States Patent
Noshad et al.

(10) Patent No.: US 10,411,799 B1
(45) Date of Patent: Sep. 10, 2019

(54) OPTICAL WIRELESS COMMUNICATION SYSTEMS WITH HADAMARD CODED MODULATION

(71) Applicants: Mohammad Noshad, Charlottesville, VA (US); Maite Brandt-Pearce, Free Union, VA (US)

(72) Inventors: Mohammad Noshad, Charlottesville, VA (US); Maite Brandt-Pearce, Free Union, VA (US)

(73) Assignee: VLNCOMM, Inc., Charlottesville, VA (US)

( * ) Notice: Subject to any disclaimer, the term of this patent is extended or adjusted under 35 U.S.C. 154(b) by 0 days.

(21) Appl. No.: 15/914,749

(22) Filed: Mar. 7, 2018

Related U.S. Application Data

(60) Provisional application No. 62/445,169, filed on Jan. 11, 2017.

(51) Int. Cl.
| | | |
|---|---|---|
| *H04B 10/114* | (2013.01) | |
| *H04B 10/116* | (2013.01) | |
| *H04B 10/00* | (2013.01) | |
| *H05B 37/02* | (2006.01) | |

(52) U.S. Cl.
CPC ....... *H04B 10/116* (2013.01); *H04B 10/1149* (2013.01)

(58) Field of Classification Search
CPC .......... G01M 11/3118; G01M 11/3127; H04B 10/071; H04B 10/1149; H04B 10/116
USPC .................................................. 398/118, 128
See application file for complete search history.

(56) References Cited

U.S. PATENT DOCUMENTS

| | | | | |
|---|---|---|---|---|
| 5,552,767 A | * | 9/1996 | Toman | G08B 5/006 340/331 |
| 8,796,948 B2 | * | 8/2014 | Weaver | H05B 37/0272 315/294 |
| 2003/0020616 A1 | * | 1/2003 | Dodds | G08B 13/183 340/600 |
| 2010/0008272 A1 | * | 1/2010 | Messinger | H04Q 9/00 370/311 |
| 2010/0188004 A1 | * | 7/2010 | Baggen | H04B 10/1141 315/209 R |
| 2010/0209105 A1 | * | 8/2010 | Shin | H04B 10/1149 398/58 |
| 2012/0082461 A1 | * | 4/2012 | Meyer | G08C 17/02 398/106 |

(Continued)

OTHER PUBLICATIONS

Elgala ["Reverse polarity optical-OFDM (RPO-OFDM): dimming compatible OFDM for gigabit VLC links" 2013 OSA Oct. 7, 2013 | vol. 21, No. 20 ] (Year: 2013).*

*Primary Examiner* — Oommen Jacob
(74) *Attorney, Agent, or Firm* — Rhodes IP PLC; Christopher R Rhodes

(57) ABSTRACT

Optical wireless communication systems configured to provide Hadamard coded information are described. In some examples, the system includes a light fixture configured to encode communication information received from an area network as Hadamard coded information, and provide the Hadamard coded information as a first Hadamard coded modulated optical emission from a light emitting diode. An optical wireless communication device can receive and decode the optical emission and provide the decoded information to an electronic device coupled to the optical wireless communication device.

19 Claims, 11 Drawing Sheets

(56) References Cited

U.S. PATENT DOCUMENTS

| | | | |
|---|---|---|---|
| 2012/0218978 A1* | 8/2012 | Ishidoshiro | F21V 33/0052 |
| | | | 370/338 |
| 2013/0026940 A1* | 1/2013 | Ganick | G01C 21/206 |
| | | | 315/224 |
| 2013/0328486 A1* | 12/2013 | Jones | H05B 37/02 |
| | | | 315/151 |
| 2014/0098840 A1* | 4/2014 | Christensen | H04B 1/7103 |
| | | | 375/148 |
| 2014/0139137 A1* | 5/2014 | Recker | H05B 37/0272 |
| | | | 315/294 |
| 2014/0273911 A1* | 9/2014 | Dunn | H04W 4/90 |
| | | | 455/404.1 |
| 2014/0329411 A1* | 11/2014 | Montena | H01R 13/6616 |
| | | | 439/620.04 |
| 2014/0368113 A1* | 12/2014 | Eckel | H05B 33/0806 |
| | | | 315/77 |
| 2015/0026649 A1* | 1/2015 | Zhao | G06F 3/0484 |
| | | | 715/863 |
| 2015/0212140 A1* | 7/2015 | Lawrence | G01R 31/025 |
| | | | 324/509 |
| 2016/0198553 A1* | 7/2016 | Fathollahi | H05B 37/0272 |
| | | | 315/291 |
| 2018/0020530 A1* | 1/2018 | Scordato | H05B 37/0236 |
| 2018/0103195 A1* | 4/2018 | Kim | H04N 13/296 |

\* cited by examiner

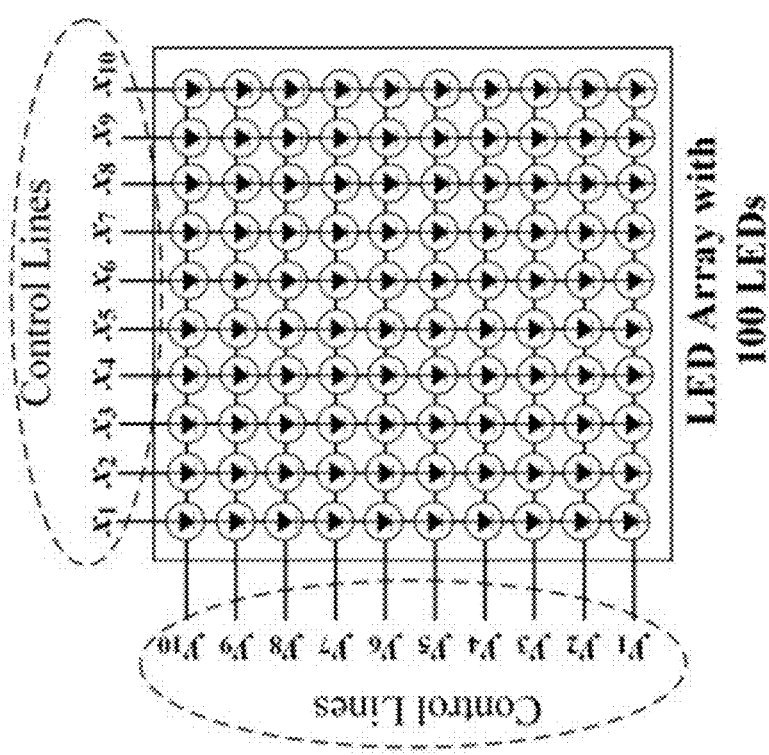
FIG. 8C
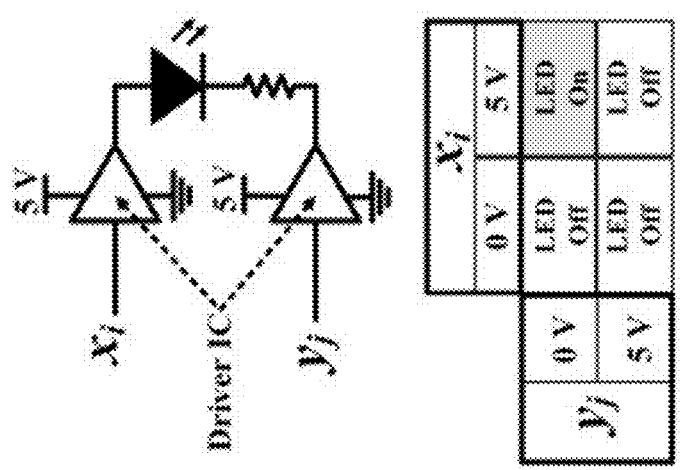
FIG. 8A
FIG. 8B

OPTICAL WIRELESS COMMUNICATION SYSTEMS WITH HADAMARD CODED MODULATION

PRIORITY APPLICATION

This application claims priority to, and the benefit of, U.S. Provisional Application No. 62/445,169 filed on Jan. 11, 2017.

TECHNOLOGICAL FIELD

Certain configurations described herein are directed to optical wireless communication systems that can implement Hadamard coded modulation to transfer information from a light fixture to an optical wireless communication device.

BACKGROUND

Use of existing encoding and modulation techniques such as Optical Frequency Division Multiplexing (OFDM) can be problematic for free-space optical communication, particularly when using optical sources such as light emitting diodes that exhibit a nonlinear intensity as a function of operating current. Similarly, simple pulse position modulation (PPM) can be inefficient from a spectrum consumption perspective, and can cause a perceptible flicker. Such flicker is generally undesirable and can even cause deleterious health effects in certain individuals.

SUMMARY

Certain aspects described herein are directed to optical wireless communication systems (OWCs) and components in them. In some examples, one or more light fixtures can be used to provide optical transfer of information from an area network, e.g., a wide area network, a local area network, etc., to the light fixture and to an optical wireless communication device, e.g., a network device, optical receiver, etc., coupled to an electronic device such as a computer, laptop, mobile device, television or other electronic devices. Information can be optically transferred from the electronic device back to the light fixture and on to the area network if desired. The exact light wavelength used may vary from visible light wavelengths (about 400 nm to about 800 nm) to infrared wavelengths (about 800 nm to about 3000 nm).

In one aspect, an optical wireless communication system for providing and receiving communication information from an area network is disclosed. In some instances, the system comprises a light fixture comprising a first processor electrically coupled to a first light emitting diode and a first optical receiver electrically coupled to the first processor. The first processor can be configured to encode communication information received from the area network as Hadamard coded information. The light emitting diode can be configured to provide the Hadamard coded information as a first Hadamard coded modulated optical emission. The system may also comprise an optical wireless communication device optically coupled to the light fixture. The optical wireless communication device can comprise a second processor electrically coupled to a second optical receiver and a second light emitting diode electrically coupled to the second processor. The second optical receiver can be configured to receive the provided first Hadamard coded modulated optical emission from the first light emitting diode. The second processor can be configured to decode the received first Hadamard coded modulated optical emission to provide decoded communication information to an electronic device coupled to the optical wireless communication device.

In certain instances, the electronic device coupled to the optical wireless communication device is wirelessly coupled to the optical wireless communication device. In other instances, the electronic device wirelessly coupled to the optical wireless communication device comprises a wireless router. In some configurations, the electronic device coupled to the optical wireless communication device is coupled through a wired device to the optical wireless communication device. In other examples, the electronic device coupled through the wired device comprises a USB interface, a micro-USB interface, a SATA interface, or a Lightning port interface.

In some examples, the optical wireless communication device is configured to receive additional communication information from the coupled device. For example, the second processor can be configured to encode the received additional communication information as Hadamard coded additional information. The second light emitting diode can be configured to provide the Hadamard coded additional information as a second Hadamard coded modulated optical emission from the optical wireless communication device. The first optical receiver of the light fixture can be configured to receive the provided second Hadamard coded modulated optical emission from the second light emitting diode. The first processor can be configured to decode the received second Hadamard coded modulated optical emission to provide decoded additional communication information to the area network.

In certain examples, the area network is coupled to the light fixture wirelessly. In some examples, the light fixture comprises a wireless router. In other examples, the light fixture is coupled to the area network in a wired manner. In certain examples, the light fixture is coupled to the area network through a fiber optic cable. In some embodiments, the light fixture is coupled to the area network through an Ethernet cable. In other examples, the light fixture is coupled to the area network through a power line.

In some examples, one or both of the first Hadamard coded modulated optical emission and the second first Hadamard coded modulated optical emission are configured as DC-reduced Hadamard coded modulated optical emissions. In certain examples, one or both of the first Hadamard coded modulated optical emission and the second first Hadamard coded modulated optical emission comprises a spectral efficiency between 4 to 6 bits/second/Hz. In some examples, the light fixture comprises a first amplitude modulator electrically coupled to the processor and the first light emitting diode, wherein the first amplitude modulator is configured to modulate the first light emitting diode to provide the first Hadamard coded modulated optical emission. In certain embodiments, the first light emitting diode is configured as a dimmable light emitting diode. In other embodiments, the first Hadamard coded modulated optical emission provided from the dimmable light emitting diode is configured as a polarity-reversed Hadamard coded modulated optical emission.

In other instances, the OWC system comprises a plurality of additional optical wireless communication devices each optically coupled to the light fixture. The light fixture can be configured to simultaneously provide and receive Hadamard coded communication information to and from, respectively, the plurality of additional optical wireless communication devices. In some examples, the light fixture comprises an array of individual light emitting diodes, and wherein each light emitting diode in the array may provide a Hadamard coded modulated optical emission independent of other light emitting diodes in the array. In some examples, the first processor is configured to encode the communication information using a Walsh Hadamard transform to provide the first Hadamard coded modulated optical emission.

In another aspect, a method of using visible light communication to transfer information optically from a light fixture to an electronic device separate from the light fixture is described. In certain configurations, the method comprises providing a first Hadamard coded modulated optical emission from a first light emitting diode to an optical wireless communication device coupled to the electronic device. The method may also comprise decoding the provided first Hadamard coded modulated optical emission using a processor of the optical wireless communication device to optically transfer information from the light fixture to the electronic device.

In certain examples, the method comprises encoding additional information provided by the electronic device to the optical wireless communication device using the processor and providing the encoded additional information received from the electronic device by the optical wireless communication device as a second Hadamard coded modulated optical emission to the light fixture to transfer the additional information from the electronic device to the light fixture. In some examples, the light fixture comprises a second processor configured to decode the provided second Hadamard coded modulated optical emission to transfer the additional information from the electronic device to the light fixture.

In some instances, the method comprises transferring the decoded additional information from a light fixture to an area network. In certain examples, the method comprises transferring the decoded additional information from the light fixture to the area network. In other examples, the method comprises transferring the decoded additional information from the light fixture to the area network through a wired connection. In further examples, the method comprises transferring the decoded additional information from the light fixture to the area network through a fiber optic cable. In other configurations, the method comprises transferring the decoded additional information from the light fixture to the area network through an Ethernet cable. In some examples, the method comprises transferring the decoded additional information from the light fixture to the area network through a power line.

In other instances, the method comprises configuring the light fixture with a plurality of independent light emitting diodes and using the processor of the light fixture to encode information received by the light fixture to provide a respective Hadamard coded modulated optical emission from each of the light emitting diodes.

In some examples, the system may be configured to permit dimming of one or more of the light emitting diodes, or the method may comprises selectively dimming one or more of the light emitting diodes.

In other examples, the system may be configured to provide flicker free light, e.g., the system or method may be configured such that each Hadamard coded modulated optical emission is flicker free or substantially no flicker is observable with the human eye.

In additional configurations, the system may be configured such that each optical emission has an intensity of at least 10 Lux, e.g., 10-50,000 Lux.

Additional aspects, embodiments, examples and configurations are described in more detail below.

BRIEF DESCRIPTION OF THE SEVERAL VIEWS OF THE DRAWINGS

Certain specific illustrations of visible light communication systems are described with reference to the accompanying figures in which:

FIG. 8A is an illustration of an LED drive circuit, in accordance with some configurations;

FIG. 8B is an illustration of LED states using control lines, in accordance with some examples;

FIG. 8C is an illustration of an LED array with control lines, in accordance with certain embodiments.

DETAILED DESCRIPTION

Various illustrations are described below with reference to certain terms and/or abbreviations. HCM refers to Hadamard Coded Modulation. OFDM refers to orthogonal frequency division multiplexing. ACO-OFDM refers to Asymmetrically Clipped Optical OFDM. BER refers to Bit Error Rate. DCR-HCM refers to DC-reduced HCM. DCO-OFDM refers to DC biased optical OFDM. MIMO refers to multi-input multi-output. OOK refers to one-off keying. SMR refers to signal to noise ratio. VC or VLC refers to visible light communications.

Figure 1A:
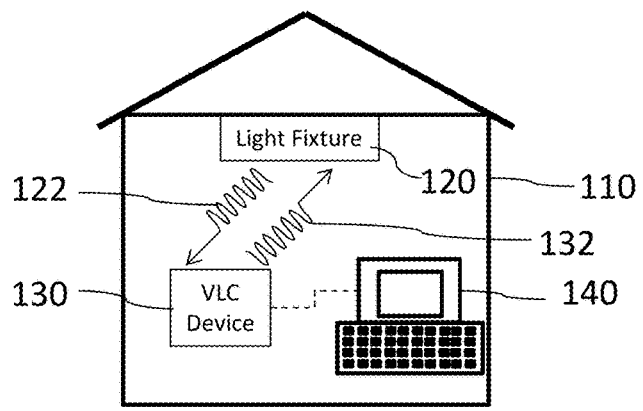
FIG. 1A is an illustration of an optical wireless communication system within a structure, in accordance with certain examples.

In certain embodiments, the systems described herein can be used to provide optical communication to one or more users. For example and referring to FIG. 1A, an optical wireless communication system within a structure 110 may comprise a light fixture 120 that is optically coupled to an optical wireless communication (OWC) device 130, e.g., a transmitter/receiver, electrically coupled to a computer 130 or other electronic device. The light fixture 120 is electrically coupled or optically coupled or both to a wide area network (WAN), local area network (LAN), etc. to receive and send information or signals to and from the area network. The area network can provide information to the light fixture 120 which can encode/modulate the information and emit light in the form of an optical emission 122 comprising the encoded information. The optical wireless communication device 130 can receive the optical emission 122 and decode the information and provide it to the computer 140 or other electronic device coupled to the OWC device 130. The computer 140 may request information from the area network and can emit light as an optical emission 132, e.g., the optical emission 132 may comprise encoded/modulated information that is received by the light fixture 120. The light fixture 120 may then decode the information received from the OWC device 130 and send a request to the area network to retrieve and send the information back to the light fixture 120. This process can be repeated to provide network communication between the area network and the computer 140 using visible light communication.

In certain examples, while the exact light wavelength may vary, typical visible light wavelengths used are in the 400-800 nm range and typical infrared light wavelengths range from 800 nm to 3000 nm. As noted in more detail below, the light fixture 120 may comprise one or more light emitting diodes (LEDs). The light fixture 120 may also comprise an optical receiver to receive optical emissions from the OWC device 130. Similarly, the OWC device 130 may comprise an optical receiver and/or optical transmitter to be able to receive and send optical signals to the light fixture 110. The OWC device 130 can wirelessly couple to the computer 140 (or another electronic device) or may couple to the computer 140 (or another electronic device) in a wired manner, e.g., through a wire between the OWC device 130 and a USB interface, a micro-USB interface, a SATA interface, or a Lightning port interface.

Figure 1B:
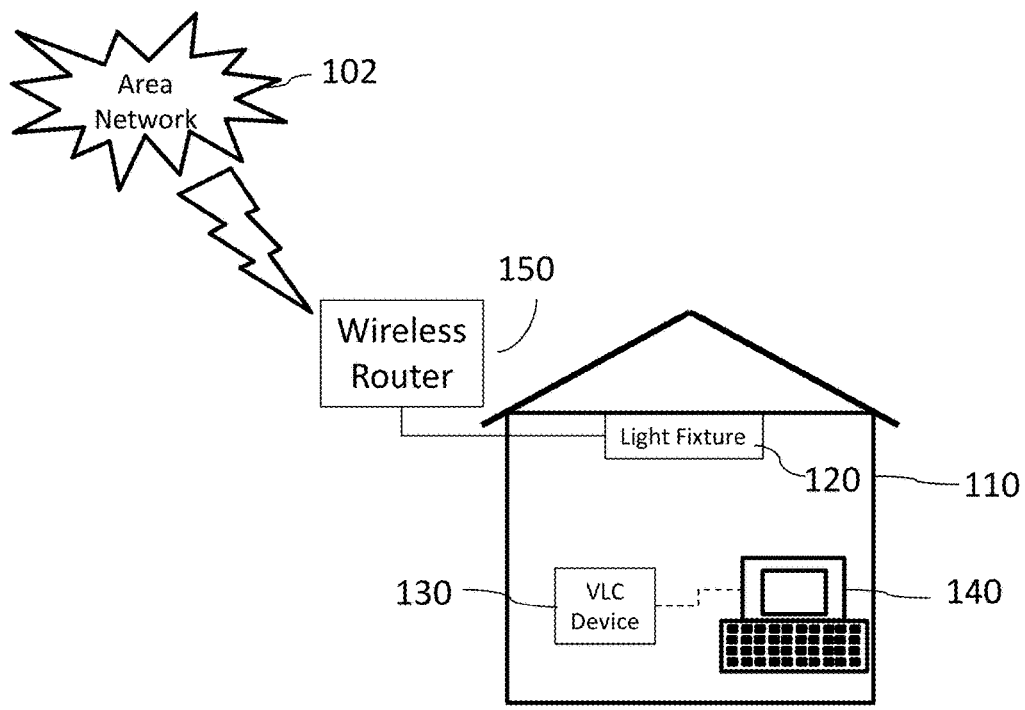
FIG. 1B is an illustration of an optical wireless communication system coupled to an area network though a wireless connection, in accordance with certain examples.
Figure 1C:
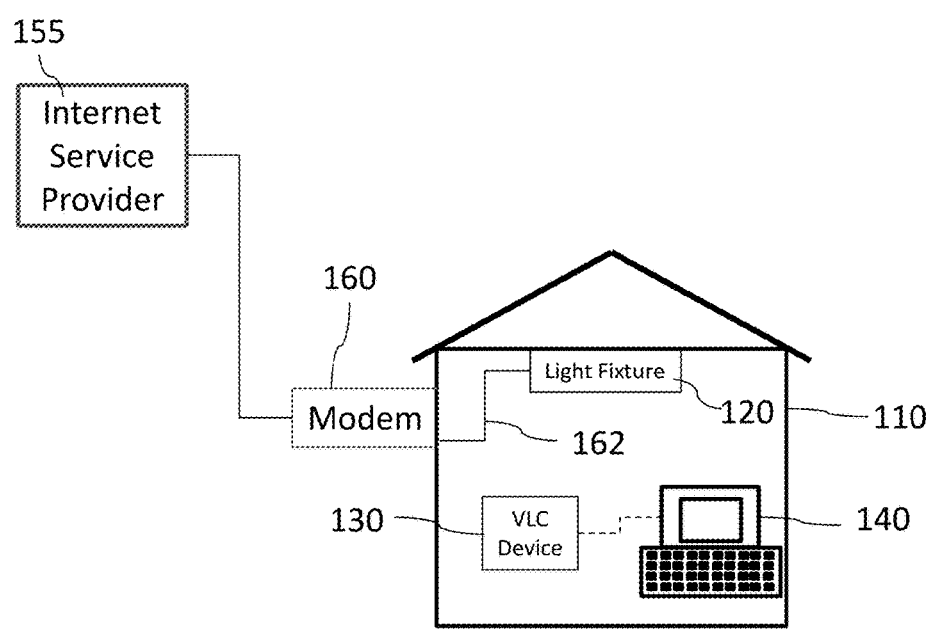
FIG. 1C is an illustration of an optical wireless communication system coupled to an area network though a wired connection, in accordance with certain examples.
Figure 1D:
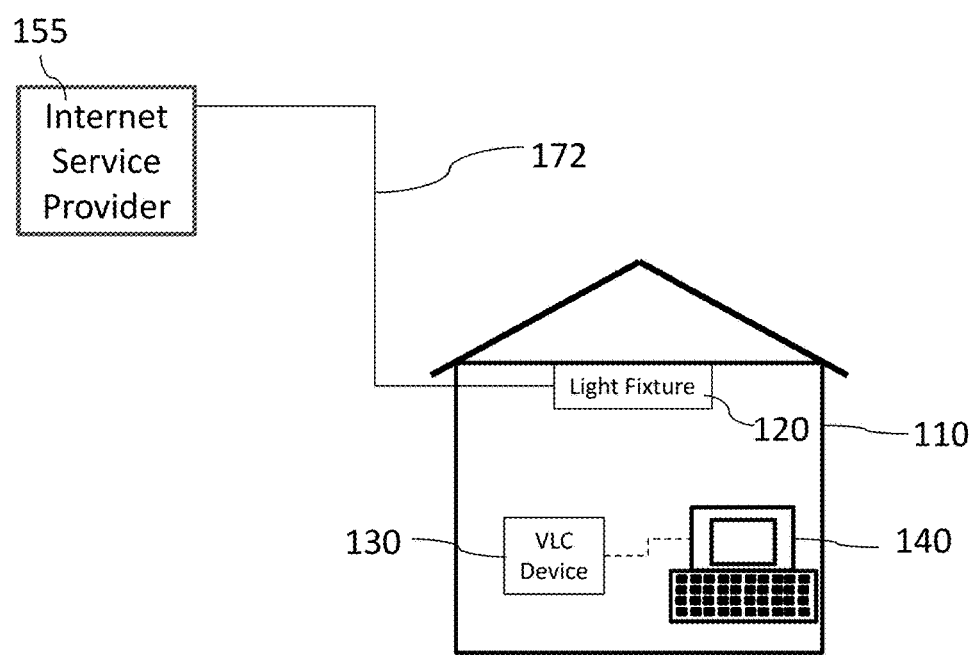
FIG. 1D is an illustration of an optical wireless communication system coupled to an area network though a power line, in accordance with certain examples.

As shown in FIGS. 1B-1D, the light fixture 120 can couple to an area network 102 such as a wide area network in numerous manners or an Internet service provider 155. Referring to FIG. 1B, wireless coupling between the light fixture 120 and a remote wireless router 150 mounted to a utility pole 155 is shown. The remote wireless router 150 can be coupled to a wide area network 102 by way or wired or wireless means. In another configuration as shown in FIG. 1C, a modem 160 can couple to the light fixture 120 through a wired connection 162. Illustrative modems include, but are not limited to, cable modems, DSL modems, dial up modems, etc. The wired connection 162 can be by way of RG-6 cable, Ethernet cable or other wired cables including both electrical and fiber optic cables. In an additional configuration, the light fixture 120 can couple to the area network directly through a power line 172 as shown in FIG. 1D. The light fixture 120 comprises its own processor and an optical transmitter/receiver to be able to send and receive optical emissions to and from the OWC device 130. The OWC device 130 typically comprises its own processor and an optical receiver/transmitter to receive optical emissions from the light fixture 120 and to send optical emissions to the light fixture 120.

In certain embodiments, the connection between the OWC device 130 and the computer 140 (or other electronic device) may be by way of a wired connection or a wireless connection. For example, the OWC device 130 may comprise a Bluetooth device, a radio transmitter, a cellular chip, etc. that can send signals or information from the OWC device to the computer 140. In some instances, optical communication between the OWC device 130 and the computer 140 can be used to transfer information. Other means of information transfer between the OWC device 130 and the computer 140 can also be used.

As noted herein, the light fixture 120 can encode/modulate signals received from the area network using Hadamard coded modulation. The encoded and modulated signals can be sent to a single user or can be used in multi-user systems as noted in more detail below. The OWC device 130 can decode the encoded and modulated signals and provide them to an electronic device electrically coupled to the OWC device 130. The electronic device can then request information from the area network, and the OWC device 130 can encode/modulate the signals and send the encoded/modulated signal back to the light fixture 120 by way of an optical emission from the OWC device 130. The encoded and modulation can be selected such that the optical emissions are flicker free or substantially flicker free to provide more aesthetic and visually appealing light emissions from a light fixture, e.g., one comprises one or more light emitting diodes.

Certain illustrative descriptions of single and multi-user OWC systems that use Hadamard coded modulation are described in more detail below.

Single User Systems

Figure 2A:
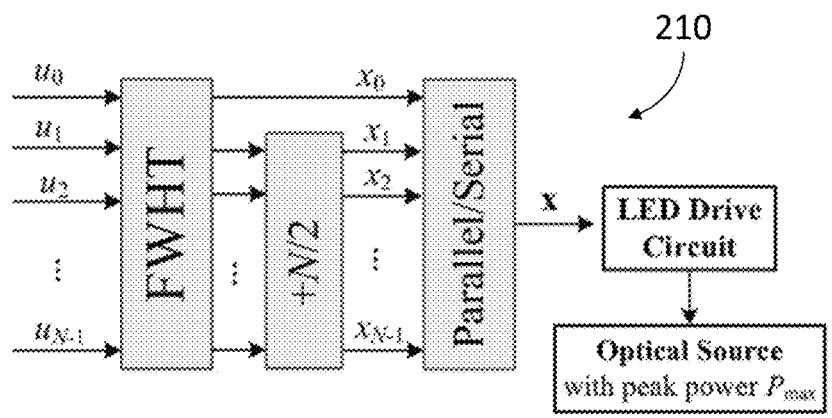
FIG. 2A is an illustration of a transmitter, in accordance with certain embodiments.
Figure 2B:
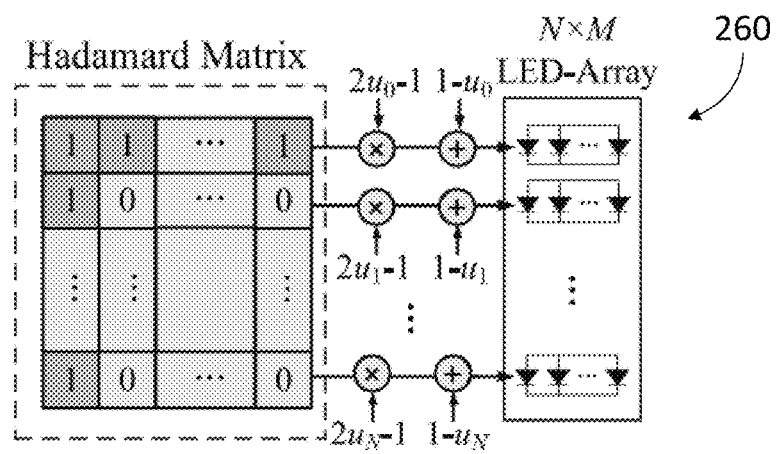
FIG. 2B is another illustration of a transmitter, in accordance with certain embodiments.
Figure 3A:
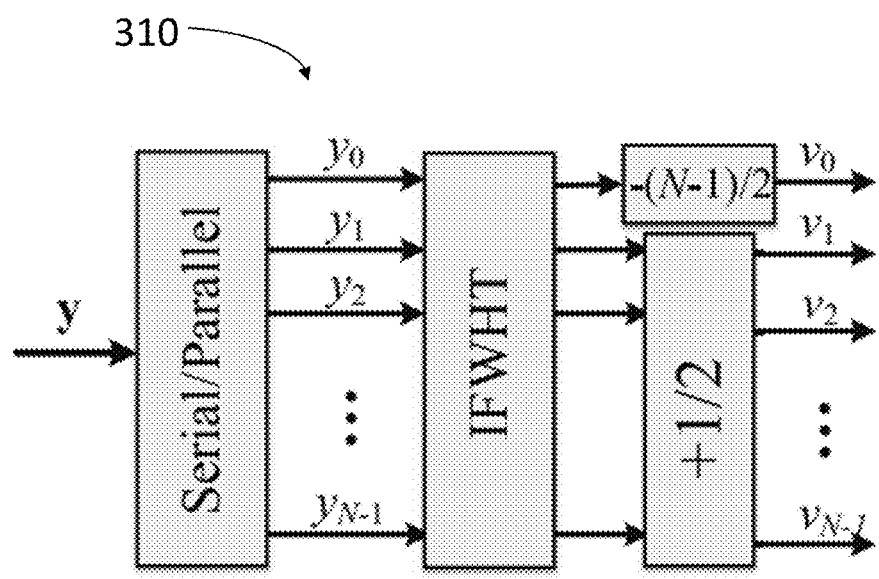
FIG. 3A is an illustration of a receiver, in accordance with certain embodiments.
Figure 3B:
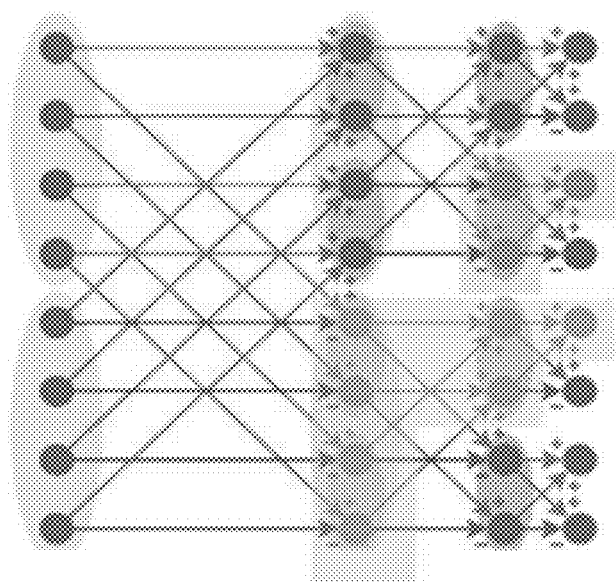
FIG. 3B is an illustration of a fast Walsh-Hadamard transform (FWTIT), in accordance with certain examples.

Single user systems with spectral efficiencies between 1 to 6 bits/s/Hz can be used to modulate light emitting diodes (LEDs), which are able to support different dimming levels and provide high-speed downlink data transmission. In certain examples, Hadamard coded modulation (HCM) that uses the Hadamard matrices as a modulation technique can be used. Without wishing to be bound by any one example, in this technique, the data is encoded and modulated using a fast Walsh-Hadamard transform (FWHT) and the receiver uses an inverse fast Walsh-Hadamard transform (FWHT) to decode the received signals as shown in FIGS. 2A and 2B (transmitters 210, 260) and in FIG. 3A (receiver 310). As noted below, each of a transmitter and a receiver can be electrically coupled to a respective processor to perform the encoding and decoding. An illustration of the fast Walsh-Hadamard transform (FWTIT) is shown in FIG. 3B.

Two structures can be used for the HCM transmitter. Referring to FIG. 2A, in the first structure, the HCM symbols generated are sent to an amplitude modulator that then modulates the optical source. This structure, which is also referred to as a single-source structure, can be used with the power-line communication (PLC) integrated OWC networks, where the data is sent to the LED bulbs via the power lines and each component of the LED array cannot be modulated separately. In the single-source structure of FIG. 2A, the nonlinear transfer function of the optical source causes unequal spacing between the transmitted power levels, which makes the symbols more susceptible to noise, and therefore, a pre-distorter is required to make the power levels equal. A control circuit is also needed to compensate for the drift clue to the thermal changes, which leads to an increased complexity of the transmitter. The transmitter and receiver have low complexities and can exploit the bandwidth effectively. A modification referred to as the DC-reduced HCM (DCR-HCM) technique can also be used. Because of their low peak to average power ratio (PAPR), HCM and DCR-HCM can provide high illumination levels in OWC systems without being affected to a substantial degree by LED-induced distortion. These modulation formats are shown to outperform other techniques, such as OOK, OFDM, and PAM in OWC systems. The methodology described herein is well adapted to LED-based OWC systems and is able to achieve significantly higher data-rates, since they can provide spectral efficiencies higher than 5 bits/s/Hz.

Figure 4A:
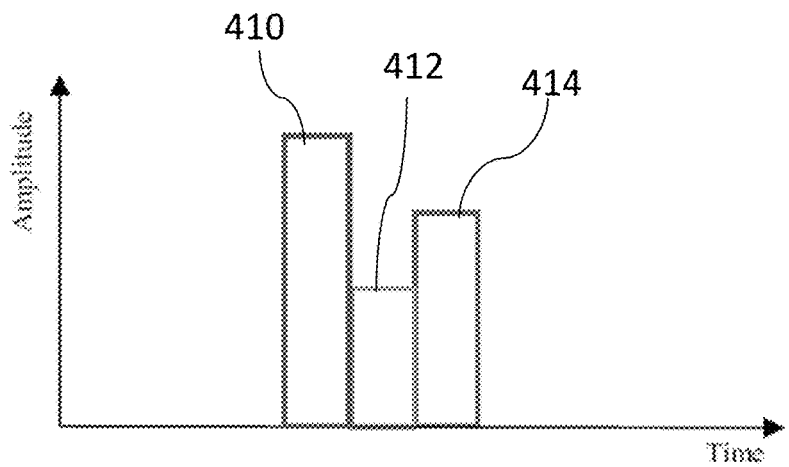
FIG. 4A is an illustration of rectangular pulses.
Figure 4B:
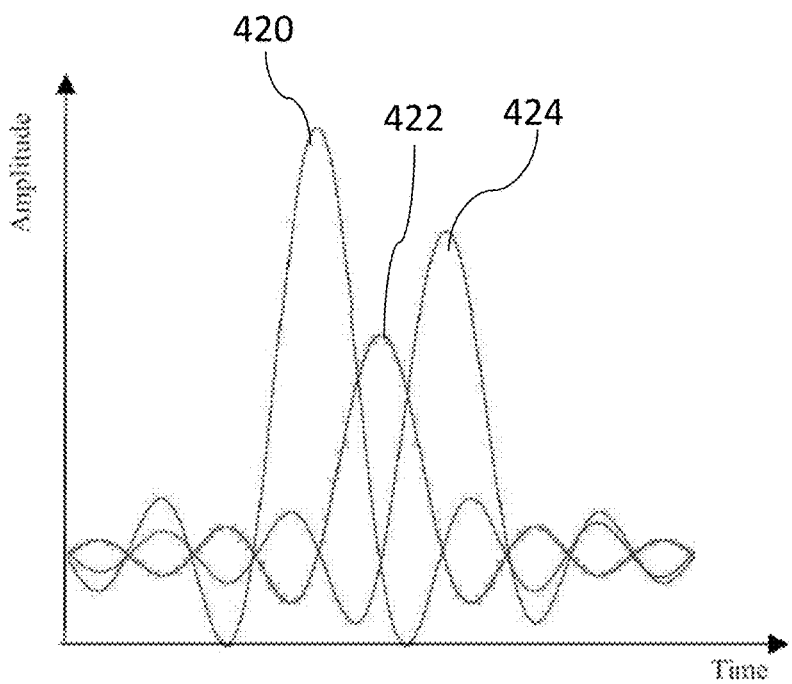
FIG. 4B is an illustration of sinc pulses provided from the rectangular pulses of FIG. 4A.
Figure 5A:
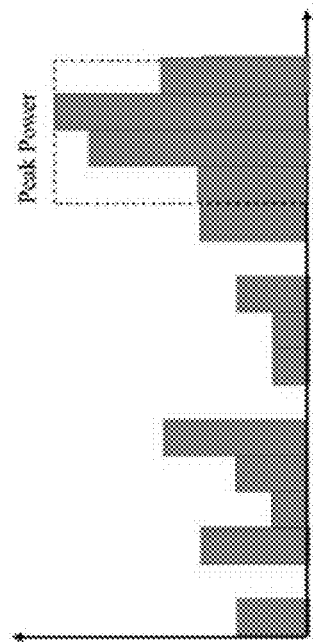
FIGS. 5A, 5B, 5C and 5D are graphs showing the symbols of polarity reversed Hadamard coded modulation (PR-HCM) that correspond to 0 0.25, 0.50 and 0.75 duty cycles respectively, in accordance with certain examples.
Figure 5B:
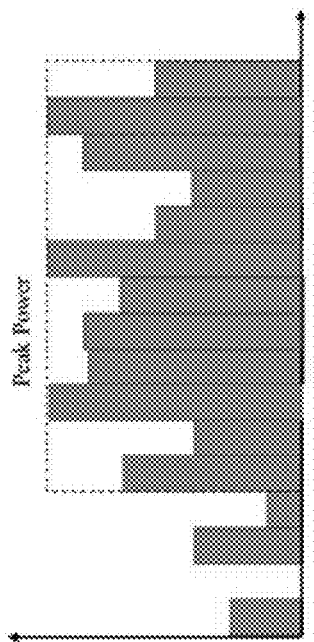
Figure 5C:
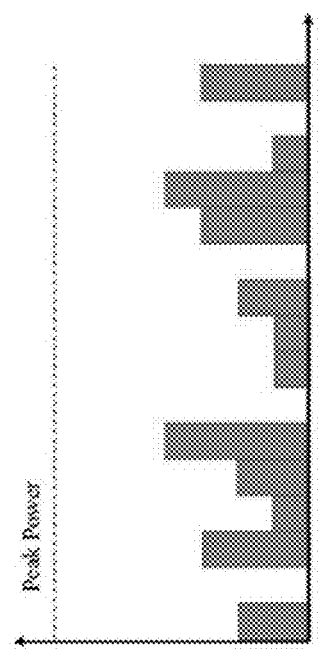
Figure 5D:
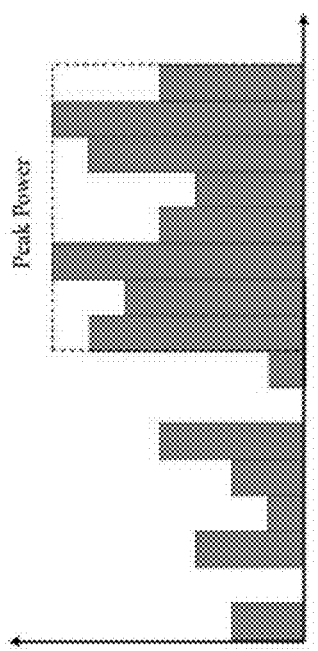

In practice, transmitting rectangular pulses can require a large bandwidth and is not spectrally efficient. In order to overcome this problem, it is possible to use sinc pulses instead of rectangular ones to transmit data. But since negative signals cannot be sent over the optical link, a DC bias can be added to the signals to make them all positive. FIG. 4B illustrates the transmitted sinc pulses for the three rectangular pulses shown in FIG. 4A. Replacing rectangular pulses with sinc pulses reduces the SNR by 0.83 dB. Rectangular pulse 410 is replaced by sinc pulse 420, rectangular pulse 412 is replaced by sinc pulse 422 and rectangular pulse 414 is replaced by sinc pulse 424.

Dimming is an important feature in the modern lighting systems, where the user can desirably change the average intensity of the light. Using the methods described herein, HCM can operate in various dimming conditions without losing the speed in the data-rate. In this method, called polarity-reversed HCM (PR-HCM), symbols of an HCM modulation with size N are divided into two parts of length M and N-M. Then the second part of the symbol, which has length N-M, is replaced with its complement, i.e. instead of transmitting $(x_1, x_2, \ldots, x_M, x_{M+1} \ldots x_N)$ the symbol $(x_1, x_2, \ldots, x_M, P_o\text{-}x_{M+1} \ldots P_o\text{-} x_N)$ is transmitted. Given that the PAPR of HCM is $\gamma$, PR HCM can have the following PAPRs $$\frac{\gamma}{M + (N - M)(\gamma - 1)}, M = 0, 1, 2, \ldots, N$$

Figure 6:
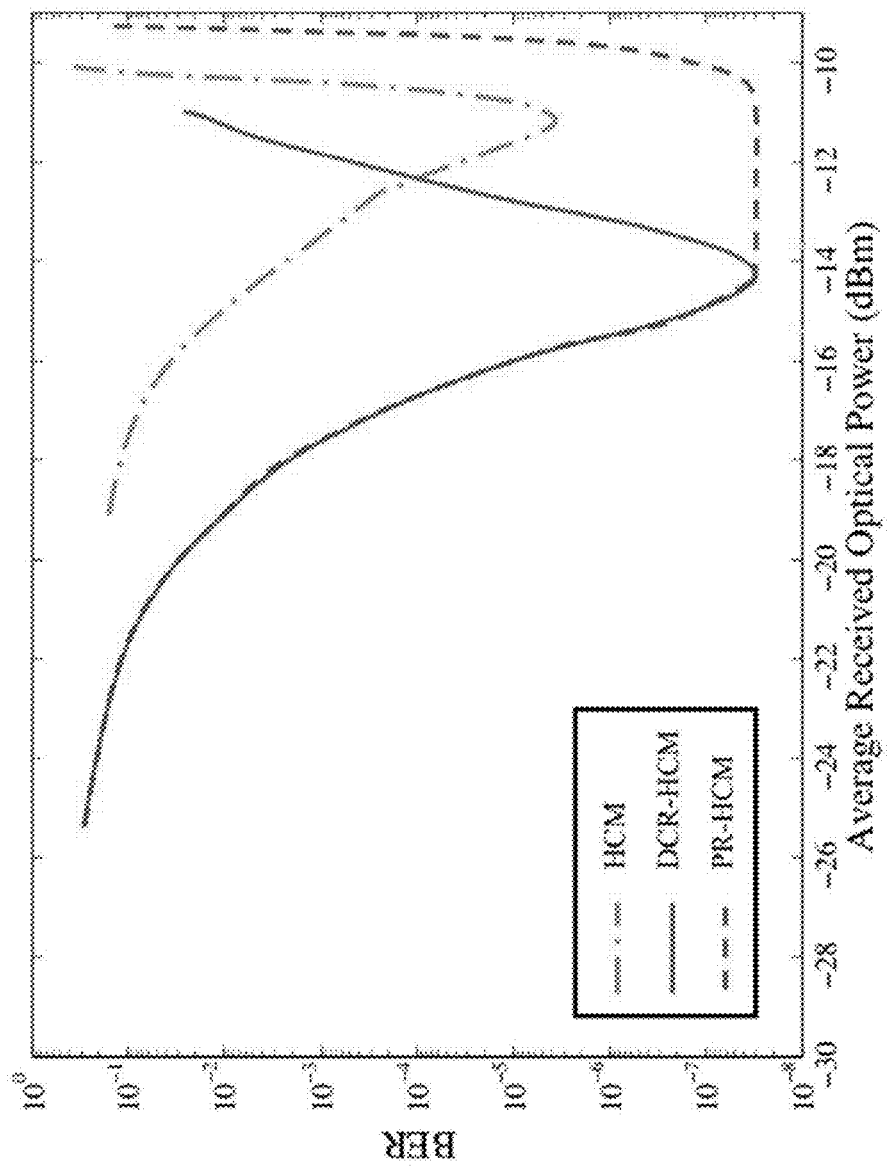
FIG. 6 is a graph showing the performance of PR-HCM versus DC-reduced HCM and HCM, in accordance with some examples.

FIGS. 5A-5D shows the symbols of PR-HCM that correspond to 0 0.25, 0.50 and 0.75 duty cycles respectively. In order to achieve the maximum performance for PR-HCM, DCR-HUM symbols can be used as the base symbols for PR-HCM. FIG. 6 shows the performance of PR-HCM versus DCR-HCM and HCM. Based on these results, PR-HCM provides good performance for a wide range of optical powers. It can provide a good dimming range with a low BER.

Multiuser Systems

As explained above, codes with spectral efficiencies between 4 to 6 bits/s/Hz can be used to modulate LEDs, which are able to support different dimming levels and provide high-speed downlink data transmission for single user OWC systems. These methods and systems can be extended to multi user systems. For example, multiple access techniques that can support 10 to 20 users with one LED access point can be used, which can support different dimming levels and provide downlink sum data transmission speeds up to 200 Mbps. This implementation can be performed using Hadamard coded modulation (HCM), which splits rows of the Hadamard matrix into subsets and allocates one subset of rows to each user. The data of each user is encoded using those designated rows and by applying an M-ary modulation, such as PAM.

In certain configurations, one technique that can be used is similar to orthogonal frequency-division multiple access (OFDMA) that is used in RF networks, but adapted to OWC systems. Using this Hadamard based multiple access technique, the OWC system will be able to improve the sum data-rate by 2-3X compared to other existing techniques. In order to support flexible data-rates for users, the Hadamard rows can be assigned to users such that a user that requires faster connection is provided more Hadamard rows. The receiver for each user can be configured to use an inverse fast Walsh-Hadamard transform (IFWHT) of size N to decode the received signals, which requires N*log(N) operations. An efficient technique to decode the received signal for each user can be used. For example, a minimum receiver complexity for each user based on the number of Hadamard rows assigned to it is listed in Table 1.

Table 1

| Number of Codes | Complexity |
|---|---|
| 1 | 31 |
| 2 | 32 |
| 3 | 35 |
| 4 | 36 |
| 5 | 43 |
| 6 | 44 |
| 7 | 47 |
| 8 | 48 |
| 9 | 63 |
| 10 | 64 |
| 11 | 67 |
| 12 | 68 |
| 13 | 75 |
| 14 | 76 |
| 15 | 79 |
| 16 | 80 |
| 17 | 111 |
| 18 | 112 |
| 19 | 115 |
| 20 | 116 |
| 21 | 123 |
| 22 | 124 |
| 23 | 127 |
| 24 | 128 |
| 25 | 143 |
| 26 | 144 |
| 27 | 147 |
| 28 | 148 |
| 29 | 155 |
| 30 | 156 |
| 31 | 159 |
| 32 | 160 |

When we increase the number of Hadamard rows assigned to a user from m to m+1, where $m=2^k n$ with n being an odd number, the complexity of the receiver for that user increases by $(2^{k+1}-1)$ operations. This result is because of the new branches that need to be added to the receiver. In FIG. 3A, the operations are added when we go from 2 to 3 Hadamard rows for a user, and the operations highlighted are added when we go from 4 to 5. Therefore, the number of operations required to decode in Hadamard rows are $$N - 1 + \sum_{i=1}^{m-1} 2^{q_i+1} - 1 = N - 1 + \sum_{i=1}^{\lfloor log_2(m-1) \rfloor} \left\lfloor \frac{m-1}{2^i} \right\rfloor (i+2) + \left\lfloor \frac{m}{2} \right\rfloor$$

where $q_i$ is the power of 2 in prime factorization of i. If user 1 needs $m_l$ Hadamard rows where $$\sum_{l=1}^{L} m_l = N$$

and let $S_l$ be the set of rows that are assigned to user l where $\cup_l S_l = \{1, 2 \ldots N\}$ and $$S_l \cap S_k = \emptyset$$

for any l≠k. Allocating adjacent rows to a user keeps the complexity low. Therefore, $S_l = \{j_l+1 \ldots j_l+m_l\}$ for some $j_l$ and the complexity of the receiver for user l is $$C_\ell = \sum_{i=j_\ell+1}^{j_\ell+m_\ell-1} 2^{q_i+1} - 1,$$

which can be further simplified as shown below.

$$C_\ell = N - 1 + \sum_{i=1}^{\lfloor \log_2(j_\ell+m_\ell-1)\rfloor} \left\lfloor \frac{j_\ell+m_\ell-1}{2^i} \right\rfloor (i+2) +$$

$$\left\lfloor \frac{j_\ell+m_\ell}{2} \right\rfloor - \sum_{i=1}^{\lfloor \log_2(j_\ell)\rfloor} \left\lfloor \frac{j_\ell}{2^i} \right\rfloor (i+2) - \left\lfloor \frac{j_\ell+1}{2} \right\rfloor$$

The goal is to minimize or reduce the sum of all complexities for all users. This optimization problem can be solved to find the optimum allocation of Hadamard rows to users, which is $$j_\ell^* = \arg\min_{j_\ell, \ell=1,2,\ldots,L} \sum_{\ell=1}^{L} C_\ell = \arg\min_{j_\ell, \ell=1,2,\ldots,L} \sum_{\ell=1}^{L} 2^{q_{j_\ell}+1} - 1$$

where for any $j_l$, $l=1, 2 \ldots L-1$, there is a k such that $j_l+m=j_k$.

Figure 7:
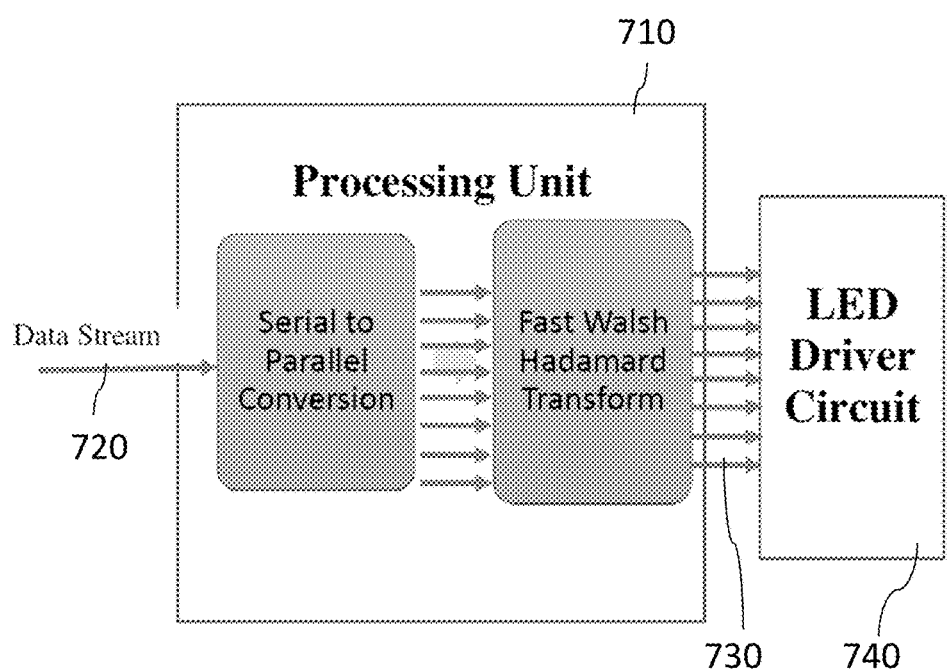
FIG. 7 is an illustration of a processor electrically coupled to an LED drive circuit, in accordance with certain configurations.

In certain embodiments and referring to FIG. 7, to implement Hadamard coded modulation in an OWC system, a processor 710 receives a data stream 720, e.g., information, signals, etc. from a WAN, and performs a fast Walsh Hadamard transformation to generate signals 730 which are provided to an LED drive circuit 740. Each LED in the array has to be on or off. In commercial LED lamps the number of LEDs per lamp can be in the order of 100 or larger, and currently controlling the LEDs in the array requires one input for each LED, which can be either impractical or expensive to implement for large LED arrays. The LED driver circuit 740 can be used to control the LED array with a smaller number of inputs. FIG. 8A shows a designed circuit to control the illumination level of an LED array of size 100 with only 20 inputs (see FIG. 8C). In the simplest scenario, the control lines are 0 or 5 V (see FIG. 8B) and each LED is on or off depending on the value of the two control lines connected to that LED. Note that since the LEDs are very close to each other, the illumination of the whole array is determined by the number of LEDs that are on. This number will be controlled by the 20 inputs $\{x_1, x_2, \ldots, x_{10}\}$ and $\{y_1, y_2, \ldots, y_{10}\}$. Assuming that M of $x_i$'s are set to 5V and N of $y_j$'s are set to 0V, M×N LEDs will be on. In a more advanced case, the control lines can take multilevel values (multiple transistors that can independently turned on or off and control the intensity of a single LED), and LEDs generate lights corresponding to the voltage difference of those inputs. This circuit configuration and control configuration significantly decreases the size and the cost of the transmitter circuit.

Figure 9:
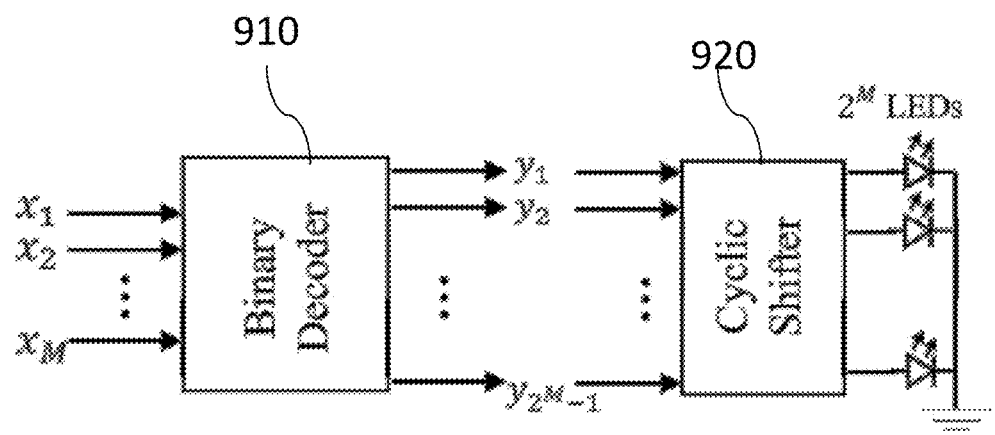
FIG. 9 is another illustration of an LED drive circuit, in accordance with certain examples.

An alternative circuit configuration can instead be used to control $2^M$ LEDs with M control lines. This circuit is shown in FIG. 9. This structure first uses a binary decoder 910 that decodes the binary input $x_1, x_2 \ldots x_M$ with decimal equivalent of k into $2^M-1$ values of $y1, y2 \ldots y_{2^M-1}$ where $y_1 \ldots y_k$ are ones and the rest of $y_{j's}$ are zero. Table 2 shows an example for M=3.

TABLE 2

| $x_1$ | $x_2$ | $x_3$ | $y_1$ | $y_2$ | $y_3$ | $y_4$ | $y_5$ | $y_6$ | $y_7$ |
|---|---|---|---|---|---|---|---|---|---|
| 0 | 0 | 0 | 0 | 0 | 0 | 0 | 0 | 0 | 0 |
| 1 | 0 | 0 | 1 | 0 | 0 | 0 | 0 | 0 | 0 |
| 0 | 1 | 0 | 1 | 1 | 0 | 0 | 0 | 0 | 0 |
| 1 | 1 | 0 | 1 | 1 | 1 | 0 | 0 | 0 | 0 |
| 0 | 0 | 1 | 1 | 1 | 1 | 1 | 0 | 0 | 0 |
| 1 | 0 | 1 | 1 | 1 | 1 | 1 | 1 | 0 | 0 |
| 0 | 1 | 1 | 1 | 1 | 1 | 1 | 1 | 1 | 0 |
| 1 | 1 | 1 | 1 | 1 | 1 | 1 | 1 | 1 | 1 |

A design criterion for this structure is that the LEDs in the array can have the same brightness. To fulfill this configuration, the average on time duration should be the same for all LEDs. Therefore, the circuit includes a cyclic shifter 920 to rotate $y_j$'s and send them $2^{M-1}$ LEDs in order to make sure LEDs have the same brightness.

In certain embodiments, the circuits described herein can be electrically coupled to a processor which can use the circuit to send and/or receive signals or information from one or more other components of the system. The encoding and decoding can be performed automatically by the processor without the need for user intervention. For example, the processor can receive information, e.g., a data stream from a WAN, encode the information using the circuits described herein to provided Hadamard coded information that is provided to a light emitting diode. An optical emission from the light emitting diode includes the encoded information. The processor can be integral to the light fixture, the network device or both or may be present on one or more interfaces or computers electrically coupled to the light fixture or network device. The processor is typically electrically coupled to one or more memory units to receive data from the other components of the system and permit adjustment of the various system parameters as needed or desired. The processor may be part of a general-purpose computer such as those based on Unix, Intel PENTIUM-type processor, Motorola PowerPC, Sun UltraSPARC, Hewlett-Packard PA-RISC processors, or any other type of processor. One or more of any type computer system may be used according to various embodiments of the technology. Further, the system may be connected to a single computer or may be distributed among a plurality of computers attached by a communications network. It should be appreciated that other functions, including network communication, can be performed and the technology is not limited to having any particular function or set of functions. Various aspects may be implemented as specialized software executing in a general-purpose computer system. The computer system may include a processor connected to one or more memory devices, such as a disk drive, memory, or other device for storing data. Memory is typically used for storing programs and data values during operation of the system. Components of the computer system may be coupled by an interconnection device, which may include one or more buses (e.g., between components that are integrated within a same machine) and/or a network (e.g., between components that reside on separate discrete machines). The interconnection device provides for communications (e.g., signals, data, instructions) to be exchanged between components of the system. The computer system typically can receive and/or issue commands within a processing time, e.g., a few milliseconds, a few microseconds or less, to permit rapid control of the system to encode the data stream and/or decode the data stream. Further, the processor can control the various rows and/or columns of an LED array to assign rows to a particular user or users. The processor typically is electrically coupled to a power source which can, for example, be an alternating current source or other power sources. As noted herein, the power source itself can be used to transmit coded information over power lines to a remote site. The system may also include suitable circuitry, e.g., an LED drive circuit, to convert signals received from the various electrical devices present in the systems. Such circuitry can be present on a printed circuit board or may be present on a separate board or device that is electrically coupled to the printed circuit board through a suitable interface, e.g., a serial ATA interface, ISA interface, PCI interface or the like or through one or more wireless interfaces, e.g., Bluetooth, Wi-Fi, Near Field Communication or other wireless protocols and/or interfaces.

In certain embodiments, the light fixture, network device or both may comprise a storage system that includes a memory chip and/or a computer readable and writeable nonvolatile recording medium in which codes of software can be stored that can be used by a program to be executed by the processor or information stored on or in the medium to be processed by the program. The medium may, for example, be a hard disk, solid state drive or flash memory. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). It may be located in the storage system or in the memory system. The processor generally manipulates the data within the integrated circuit memory and then copies the data to the medium after processing is completed. A variety of mechanisms are known for managing data movement between the medium and the integrated circuit memory element and the technology is not limited thereto. The technology is also not limited to a particular memory system or storage system. In certain embodiments, the system may also include specially-programmed, special-purpose hardware, for example, an application-specific integrated circuit (ASIC) or a field programmable gate array (FPGA). Aspects of the technology may be implemented in software, hardware or firmware, or any combination thereof. Further, such methods, acts, systems, system elements and components thereof may be implemented as part of the systems described above or as an independent component. Although specific systems are described by way of example as one type of system upon which various aspects of the technology may be practiced, it should be appreciated that aspects are not limited to being implemented on the described system.

In certain examples, the processor and an operating system may together define a platform for which application programs in high-level programming languages may be written. For example, software control of the various LEDs of the array can be implemented if desired. It should be understood that the technology is not limited to a particular system platform, processor, operating system, or network. Also, it should be apparent to those skilled in the art, given the benefit of this disclosure, that the present technology is not limited to a specific programming language or computer system. Further, it should be appreciated that other appropriate programming languages and other appropriate systems could also be used. In certain examples, the hardware or software can be configured to implement cognitive architecture, neural networks or other suitable implementations. If desired, one or more portions of the computer system may be distributed across one or more computer systems coupled to a communications network. These computer systems also may be general-purpose computer systems. For example, various aspects may be distributed among one or more computer systems configured to provide a service (e.g., servers) to one or more client computers, or to perform an overall task as part of a distributed system. For example, various aspects may be performed on a client-server or multi-tier system that includes components distributed among one or more server systems that perform various functions according to various embodiments. These components may be executable, intermediate (e.g., IL) or interpreted (e.g., Java) code which communicate over a communication network (e.g., the Internet) using a communication protocol (e.g., TCP/IP). It should also be appreciated that the technology is not limited to executing on any particular system or group of systems. Also, it should be appreciated that the technology is not limited to any particular distributed architecture, network, or communication protocol.

In some instances, various embodiments may be programmed using an object-oriented programming language, such as, for example, SQL, SmallTalk, Basic, Java, Javascript, PHP, C++, Ada, Python, iOS/Swift, Ruby on Rails or C# (C-Sharp). Other object-oriented programming languages may also be used. Alternatively, functional, scripting, and/or logical programming languages may be used. Various configurations may be implemented in a non-programmed environment (e.g., documents created in HTML, XML or other format that, when viewed in a window of a browser program, render aspects of a graphical-user interface (GUI) or perform other functions). Certain configurations may be implemented as programmed or non-programmed elements, or any combination thereof. In some instances, the systems may comprise a remote interface such as those present on a mobile device, tablet, laptop computer or other portable devices which can communicate through a wired or wireless interface and permit operation of the systems remotely as desired.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, configurations, examples and embodiments have been described above, it will be recognized by the person of ordinary skill in the art, given the benefit of this disclosure, that additions, substitutions, modifications, and alterations of the disclosed illustrative aspects, configurations, examples and embodiments are possible.

What is claimed is:

1. An optical wireless communication system for providing and receiving communication information from an area network, the system comprising:
 a light fixture comprising a first processor electrically coupled to a first light emitting diode and a first optical receiver electrically coupled to the first processor, wherein the first processor is configured to encode communication information received from the area network as Hadamard coded information, and wherein the light emitting diode is configured to provide the Hadamard coded information as a first Hadamard coded modulated optical emission; and an optical wireless communication device optically coupled to the light fixture, wherein the optical wireless communication device comprises a second processor electrically coupled to a second optical receiver and a second light emitting diode electrically coupled to the second processor, wherein the second optical receiver is configured to receive the provided first Hadamard coded modulated optical emission from the first light emitting diode, and wherein the second processor is configured to decode the received first Hadamard coded modulated optical emission to provide decoded communication information to an electronic device coupled to the optical wireless communication device, wherein the optical wireless communication device is configured to receive additional communication information from the coupled device, wherein the second processor is configured to encode the received additional communication information as Hadamard coded additional information, wherein the second light emitting diode is configured to provide the Hadamard coded additional information as a second Hadamard coded modulated optical emission from the optical wireless communication device, wherein the first optical receiver of the light fixture is configured to receive the provided second Hadamard coded modulated optical emission from the second light emitting diode, and wherein the first processor is configured to decode the received second Hadamard coded modulated optical emission to provide decoded additional communication information to the area network.

2. The optical wireless communication system of claim 1, wherein the electronic device coupled to the optical wireless communication device is wirelessly coupled to the optical wireless communication device.

3. The optical wireless communication system of claim 2, wherein the electronic device wirelessly coupled to the optical wireless communication device comprises a wireless router.

4. The optical wireless communication system of claim 1, wherein the electronic device coupled to the optical wireless communication device is coupled through a wired device to the optical wireless communication device.

5. The optical wireless communication system of claim 4, wherein the electronic device coupled through the wired device comprises a USB interface, a micro-USB interface, a SATA interface, or a Lightning port interface.

6. The optical wireless communication system of claim 1, wherein the area network is coupled to the light fixture wirelessly.

7. The optical wireless communication system of claim 6, wherein the light fixture comprises a wireless router.

8. The optical wireless communication system of claim 1, wherein the light fixture is coupled to the area network in a wired manner.

9. The optical wireless communication system of claim 1, wherein the light fixture is coupled to the area network through a fiber optic cable.

10. The optical wireless communication system of claim 1, wherein the light fixture is coupled to the area network through an Ethernet cable.

11. The optical wireless communication system of claim 10, wherein the light fixture is coupled to the area network through a power line.

12. The optical wireless communication system of claim 1, wherein one or both of the first Hadamard coded modulated optical emission and the second first Hadamard coded modulated optical emission are configured as DC-reduced Hadamard coded modulated optical emissions.

13. The optical wireless communication system of claim 1, wherein one or both of the first Hadamard coded modulated optical emission and the second first Hadamard coded modulated optical emission comprises a spectral efficiency between 1 to 6 bits/second/Hz.

14. The optical wireless communication system of claim 1, wherein the light fixture comprises a first amplitude modulator electrically coupled to the processor and the first light emitting diode, wherein the first amplitude modulator is configured to modulate the first light emitting diode to provide the first Hadamard coded modulated optical emission.

15. The optical wireless communication system of claim 1, wherein the first light emitting diode is configured as a dimmable light emitting diode.

16. The optical wireless communication system of claim 15, wherein the first Hadamard coded modulated optical emission provided from the dimmable light emitting diode is configured as a polarity-reversed Hadamard coded modulated optical emission.

17. The optical wireless communication system of claim 16, further comprising a plurality of additional optical wireless communication devices each optically coupled to the light fixture, wherein the light fixture is configured to simultaneously provide and receive Hadamard coded communication information to and from, respectively, the plurality of additional optical wireless communication devices.

18. The optical wireless communication system of claim 17, wherein the light fixture comprises an array of individual light emitting diodes, and wherein each light emitting diode in the array may provide a Hadamard coded modulated optical emission independent of other light emitting diodes in the array.

19. The optical wireless communication system of claim 1, wherein the first processor is configured to encode the communication information using a Walsh Hadamard transform to provide the first Hadamard coded modulated optical emission.

* * * * *